United States Patent [19]
Lai et al.

[11] Patent Number: 6,027,348
[45] Date of Patent: Feb. 22, 2000

[54] GROUNDING PLATE FOR AN IC CARD CONNECTOR APPARATUS

[75] Inventors: Ming-Chuan Lai, Hsin-Chuang; Shun-Chi Tung, Tu-Chen, both of Taiwan

[73] Assignee: Hon Hai Precision Ind. Co., Ltd., Taipei Hsien, Taiwan

[21] Appl. No.: 09/337,863

[22] Filed: Jun. 21, 1999

[30] Foreign Application Priority Data

Dec. 31, 1998 [TW] Taiwan ................................... 87222080

[51] Int. Cl.[7] ....................................................... H01R 9/09
[52] U.S. Cl. .............................................................. 439/92
[58] Field of Search ............................. 439/92, 607, 101, 439/108, 64, 95, 946, 74

[56] References Cited

U.S. PATENT DOCUMENTS 5,588,850  12/1996  Pan et al. ................................... 439/92
5,795,190   8/1998  Ono ........................................ 439/607

Primary Examiner—Gary F. Paumen
Attorney, Agent, or Firm—Wei Te Chung

[57] ABSTRACT

An IC card connector apparatus mounted on a circuit board has a header connector with two arrays of conductive terminals extending therethrough. A grounding plate with a plurality of fingers integrally formed thereon is disposed on a bottom surface of the header connector for directly contacting a plurality of corresponding pads formed on the circuit board.

5 Claims, 4 Drawing Sheets

GROUNDING PLATE FOR AN IC CARD CONNECTOR APPARATUS

BACKGROUND OF THE INVENTION

The present invention relates to an IC card connector apparatus, and particularly to an IC card connector apparatus having a plurality of grounding fingers for directly contacting grounding pads of a circuit board.

DESCRIPTION OF PRIOR ART

Taiwan Patent Application No. 85216014 discloses a conventional header connector. As shown in FIG. 1, the conventional header connector 10 mounted on a first circuit board 12 includes an insulative housing 14 having two arrays of conductive terminals 18 assembled therein. Each terminal 18 has a mounting portion 20 outwardly and upwardly extending from the housing 14 and received in a second circuit board 22 which is connected to the first board 12 via a socket 24 on the first board 12. In addition, a grounding plate (not labeled) is mounted to a side of the header connector 10 and integrally forming a plurality of grounding ends 26 substantially parallel to the terminals 18. The grounding ends 26 are received in the second board 22. The grounding ends 26 are connected with a grounding circuit (not shown) of the first board 12 via the socket.

Since both the terminals 18 and the grounding ends 26 are received in the second board 22, the upwardly bent grounding ends 26 require the contact portions 20 of the terminals 18 to be engaged with the second board 22 at a higher level. Thus, an increase of occupied space within the computer enclosure results. Furthermore, the contact portions 20 of the terminals 18 and the grounding ends 26 are processed by a soldering procedure to be bonded with the second board 22. Such a method is time and cost inefficient. In addition, the electrical path between the ends 26 of the grounding plate and the grounding circuit of the first board involves several components, thereby, further increasing the electrical resistance thereof.

SUMMARY OF THE INVENTION

Accordingly, the primary object of the present invention is to provide an IC card connector apparatus having a short grounding path which can quickly eliminate interference signals on the IC card during insertion of the IC card into the apparatus.

Another object of the present invention is to provide an IC card apparatus having grounding means which directly contacts a grounding circuit of a PC board.

A further object of the present invention is to provide an IC card connector apparatus with grounding means which has a simple structure and can be easily assembled.

Yet another object of the present invention is to provide an IC card connector apparatus having a limited height for promoting an efficient use of space within a computer enclosure.

To fulfill the above-mentioned objects, an IC card connector apparatus mounted on a circuit board comprises a header connector having an insulative housing with a plurality of terminals received therein and a grounding plate disposed on a bottom surface of the housing. The grounding plate integrally forms a plurality of tabs for contacting grounding portions formed on an IC card which is adapted to be inserted into the header connector. The grounding plate further forms a plurality of fingers downwardly bent for directly contacting grounding pads of the circuit board. Therefore, interference signals on the IC card can be quickly eliminated thereby ensuring proper signal transmission between the IC card and the header connector.

Other objects, advantages and novel features of the invention will become more apparent from the following detailed description when taken in conjunction with the accompanying drawings.

DETAILED DESCRIPTION OF A PREFERRED EMBODIMENT

Figure 1:
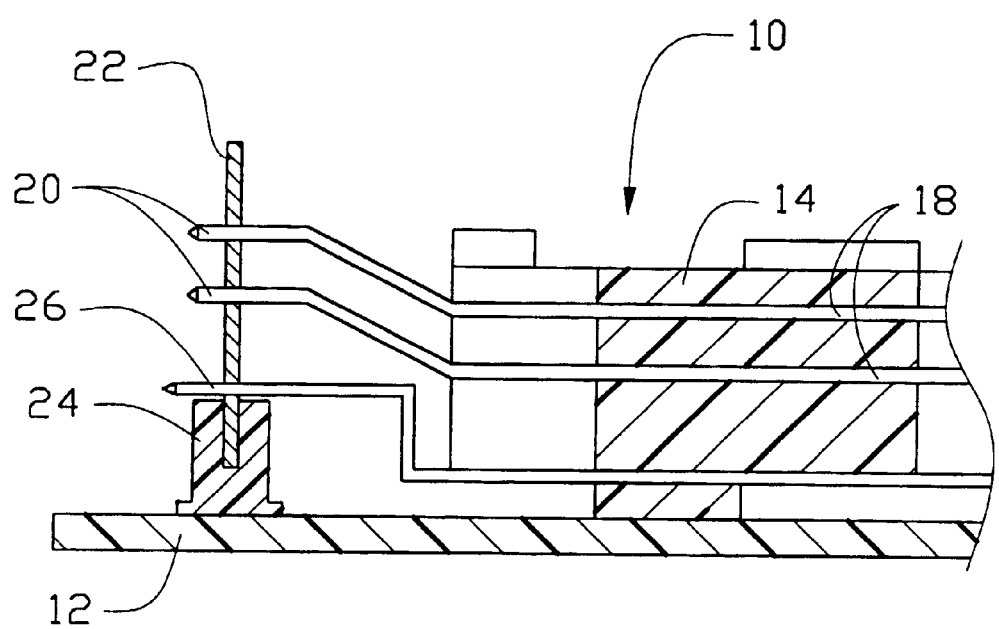
FIG. 1 is a partial, cross-sectional view of a conventional header connector for connecting an IC card.
Figure 2:
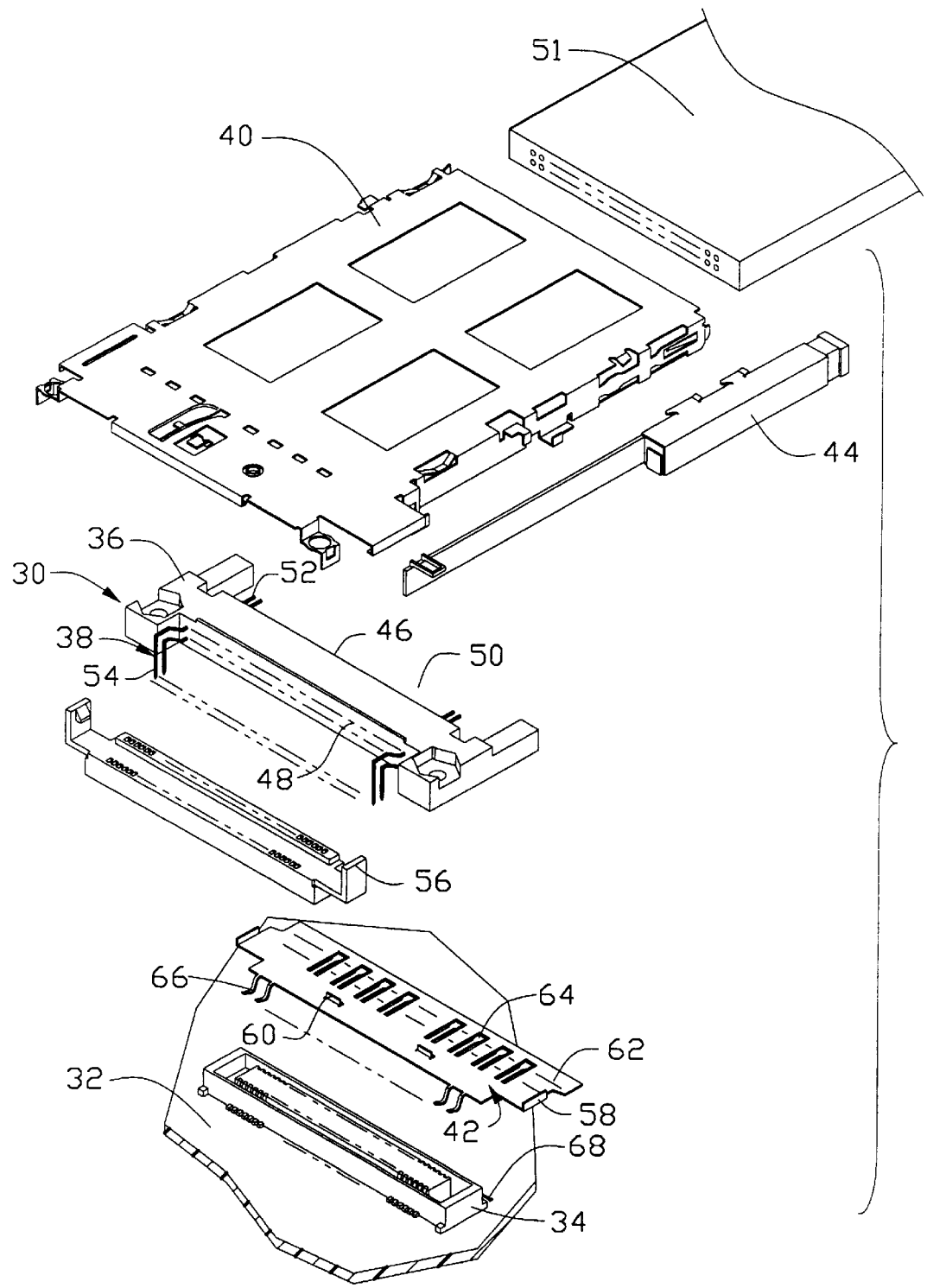
FIG. 2 is an exploded view of an IC card connector apparatus in accordance with the present invention.
Figure 3:
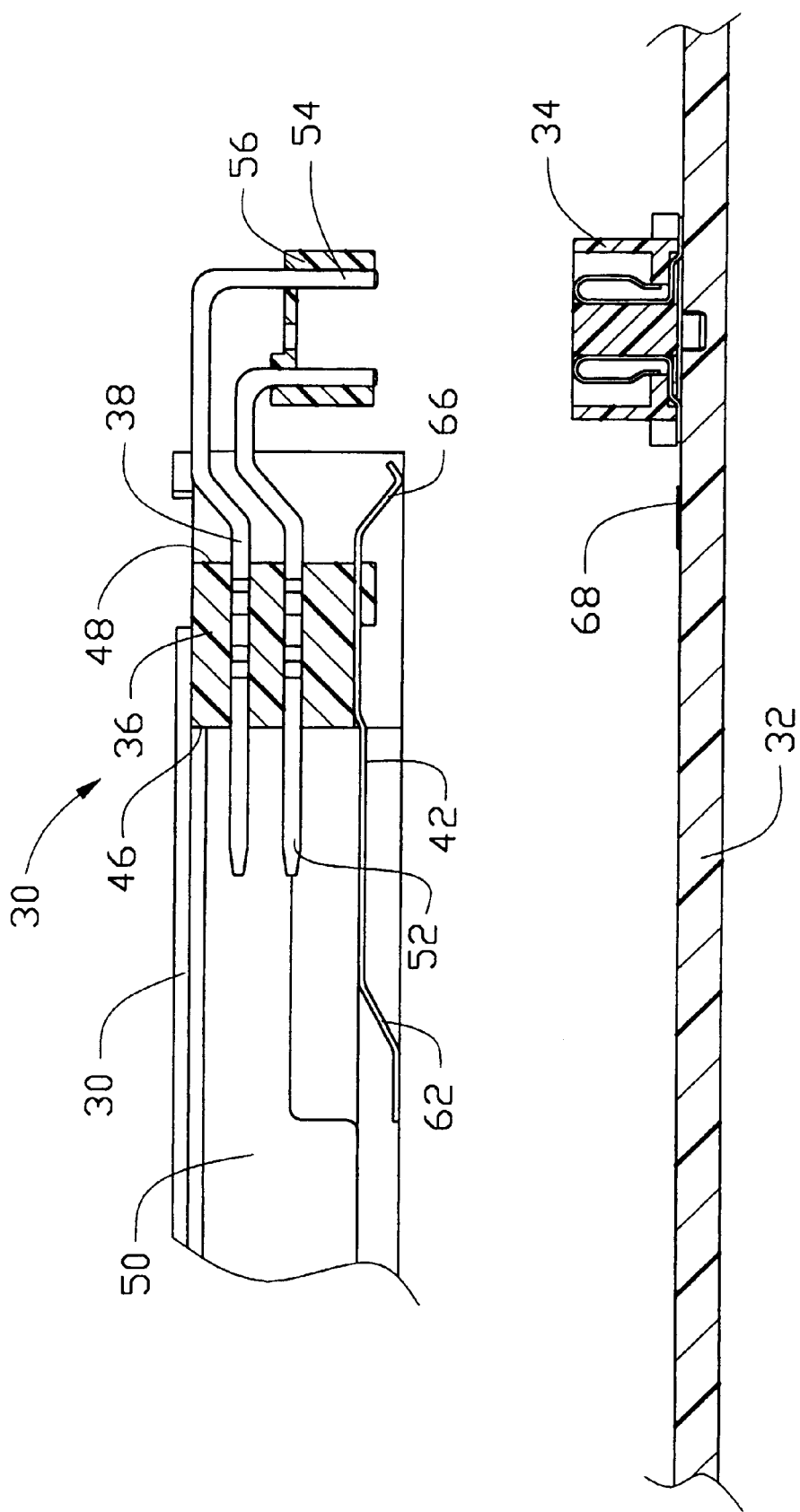
FIG. 3 is a partial cross-sectional view of the IC card connector apparatus of the present invention before assembly to a printed circuit board.

Referring to FIGS. 2 and 3, an IC card connector apparatus connected to a circuit board 32 by means of a socket 34 mounted thereon, has a header connector 30, a shielding plate 40, an elongate grounding plate 42 and an ejector mechanism 44. The header connector 30 includes an insulative housing 36 defining a front surface 48, a rear surface 46, and a space 50 adjacent to the rear surface 46 for receiving an IC card 51 therein. A plurality of conductive terminals 38 having mating ends 52 and mounting ends 54 is received in an array of passageways defined between the front surface 48 and the rear surface 46 of the housing 36. The mating ends 52 extend into the space 50 for engaging the IC card 51. The mounting ends 38 extend beyond the rear surface 48 of the housing 36 and are received in an elongate portion 56 which is mated with the socket 34 mounted on. The shielding plate 40 is disposed on a top surface of the housing 36.

The grounding plate 42 is disposed on a bottom surface of the housing 36. The grounding plate 42 includes a pair of bent portions 58 formed at opposite ends thereof and a pair of ribs 60 defined between the bent portions 58. The bent portions 58 and the ribs 60 are adapted to secure the grounding plate 42 to the bottom surface of housing 36. In addition, the grounding plate 42 forms a slanted leading edge 62 for facilitating insertion of the IC card 51 into the header connector 30. Furthermore, a plurality of tabs 64 is integrally formed on the leading edge 62 of the grounding plate 42 for contacting corresponding grounding portions (not shown) formed on the IC card 51. A plurality of spring fingers 66 is integrally formed on an edge of the grounding plate 42 opposite the leading edge 62. The spring fingers 66 are bent to contact the circuit board 32.

Figure 4:
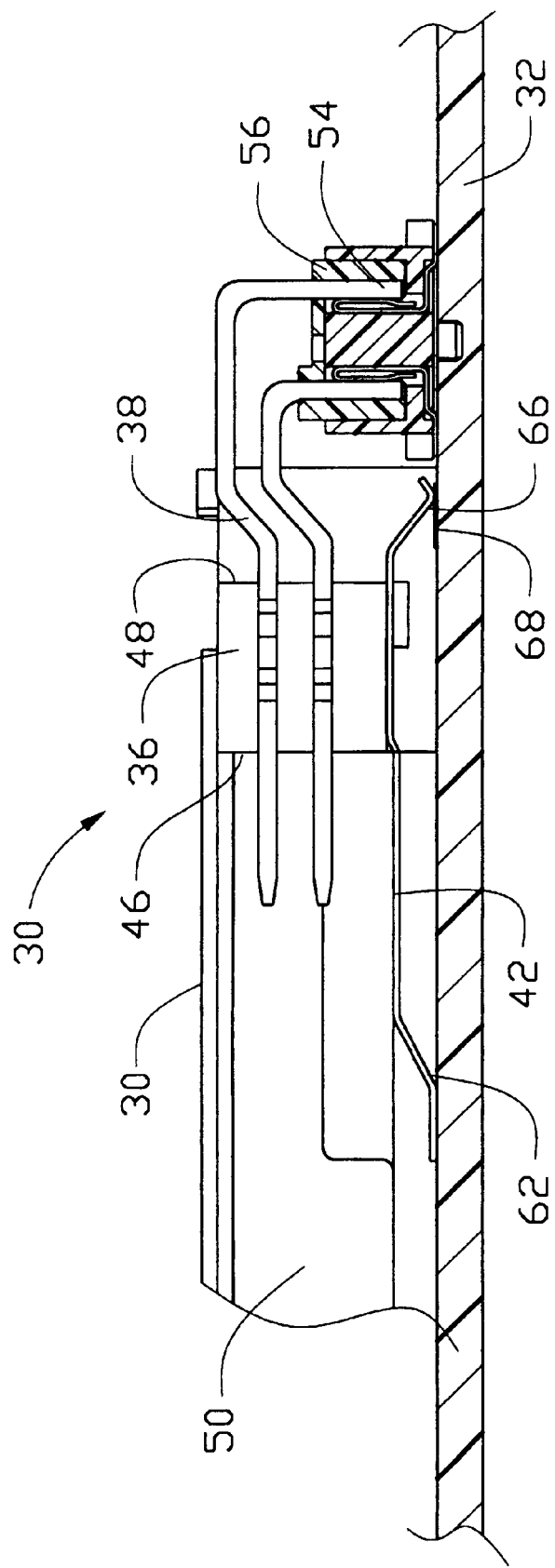
FIG. 4 is similar to FIG. 3 wherein the IC card apparatus assembled to the printed circuit board.

Also referring to FIG. 4, when assembled, the spring fingers 66 of the grounding plate 42 directly contact corresponding grounding pads 68 formed on the circuit board 32. When the IC card 51 is inserted into the space 50 of the header connector 30, the grounding portions formed on the IC card 51 contact the corresponding tabs 64 of the grounding plate 42. Thus, interference signals on the IC card 51 are eliminated through the spring fingers 66 of the grounding plate 42 and the grounding pads 68 of the circuit board 32.

It is readily apparent that such a short grounding path can quickly eliminate interference signals on the IC card 51 to ensure proper and reliable signal transmission between the IC card 51 and the header connector 30. The grounding plate 42 has a simple structure and can be easily assembled. In addition, the direct contact between the spring fingers 66 of the grounding plate 42 and the grounding pads 68 of the circuit board 32 effectively eliminates the requirement of the specific arrangement of the grounding means of the prior art. Thus, the height of the apparatus is reduced thereby promoting an efficient use of space within a computer enclosure. The tabs 64 of the grounding plate 42 may be soldered to the circuit board 32 for more reliably connecting with a grounding circuit thereof.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the fill extent indicated by the broad general meaning of the terms in which the appended claims are expressed.

What is claimed is:

1. An electrical connector apparatus mounted on a circuit board for receiving an IC card, comprising:

a header connector having an insulative housing and two arrays of terminals extending through the insulative housing; and a grounding plate disposed on one side of the header connector proximate to the circuit board, the grounding plate having a plurality of fingers for directly contacting corresponding pads on the circuit board;

wherein said grounding plate is secured to and extends along a bottom surface of the housing between the housing and the circuit board.

2. The electrical connector apparatus as claimed in claim 1, wherein said fingers are integrally formed on the grounding plate.

3. The electrical connector apparatus as claimed in claim 1, wherein said grounding plate comprises a slanted leading edge for guiding insertion of the IC card.

4. The electrical connector apparatus as claimed in claim 3, wherein a plurality of tabs is formed on said leading edge for contacting an IC card grounding portion.

5. A connector assembly comprising:

a header having an insulative housing with two arrays of terminals extending through said housing, each of said terminals including a downward extending mounting end;

a grounding plate positioned on the header with a plurality of fingers thereof;

an elongated portion attached to the housing and receiving the mounting end of each of the terminals therein;

a circuit board, on which the header is mounted, including a plurality of grounding pads thereon; and a socket mounted on said circuit board; wherein said grounding pads and said fingers are arranged to directly contact each other when the elongated portion with the mounting ends of the terminals is fully mated with the socket;

wherein said grounding plate is secured to and extends along a bottom surface of the housing between the housing and the circuit board.

* * * * *